Dec. 1, 1925.
A. RONTANI
AUTOMOBILE FENDER
Filed June 5, 1925
1,564,116
2 Sheets-Sheet 1
Fig. I.
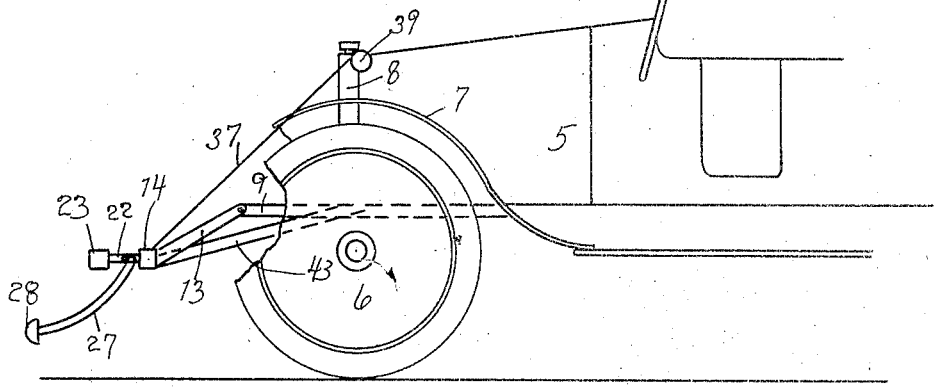
Fig. II.
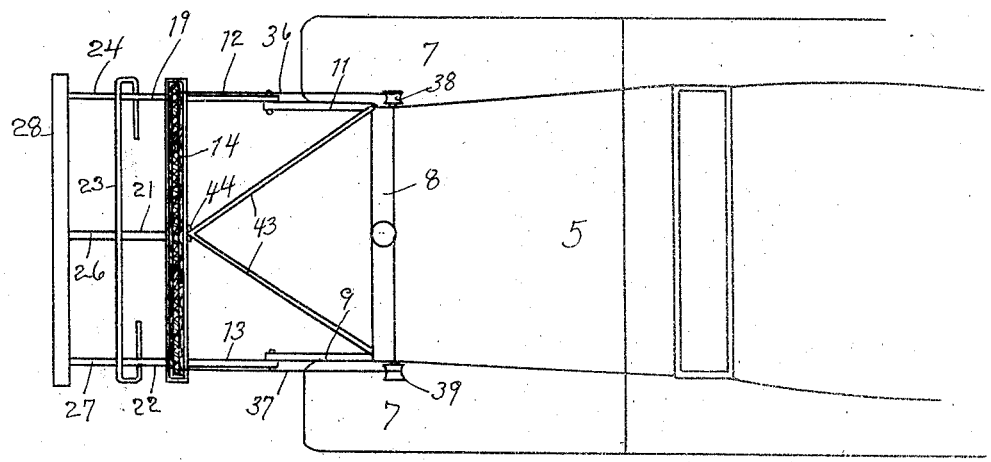
INVENTOR.
A. RONTANI
BY Victor J. Evans
ATTORNEYS.

Dec. 1, 1925.
A. RONTANI
AUTOMOBILE FENDER
Filed June 5, 1925
1,564,116
2 Sheets-Sheet 2
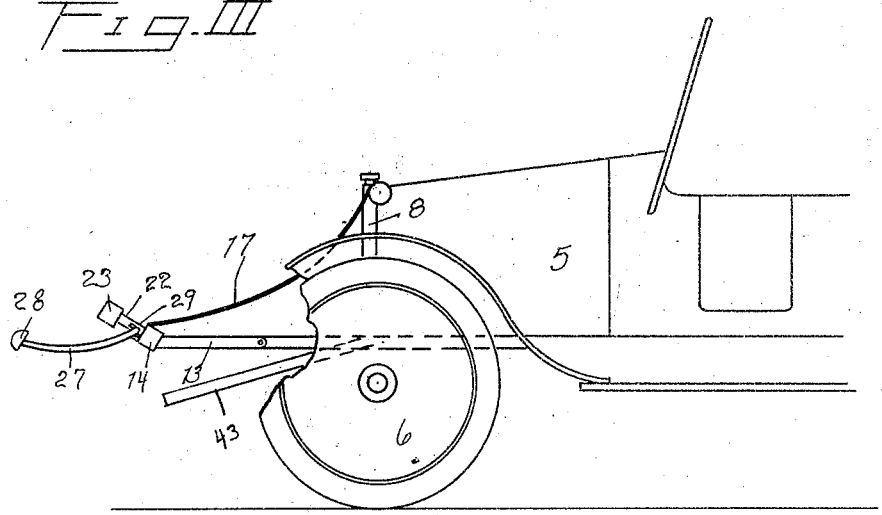
Fig. III
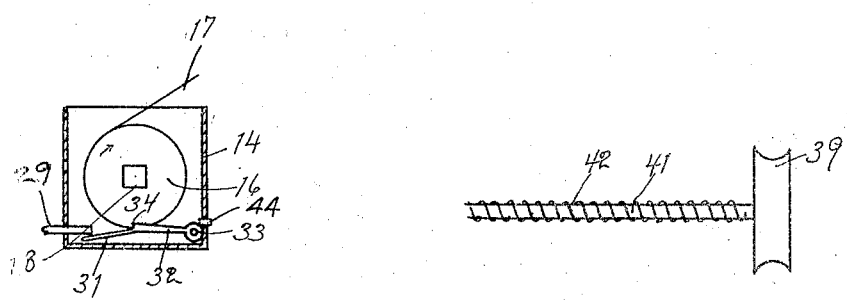
Fig. IV
Fig. V
INVENTOR.
A. RONTANI
BY *Victor J. Evans*
ATTORNEYS.

Patented Dec. 1, 1925.

1,564,116

UNITED STATES PATENT OFFICE.

AGOSTINO RONTANI, OF CLOVERDALE, CALIFORNIA.

AUTOMOBILE FENDER.

Application filed June 5, 1925. Serial No. 35,133.

BEST AVAILABLE COPY

*To all whom it may concern:*

Be it known that I, AGOSTINO RONTANI, a citizen of the United States, residing at Cloverdale, in the county of Sonoma and State of California, have invented new and useful Improvements in Automobile Fenders, of which the following is a specification.

This invention relates to improvements in automobile fenders and has particular reference to a fender adapted to be attached to the front of an automobile for the purpose of catching a person who may be struck by the front of a machine.

The principal object of this invention is to provide means whereby a net will be moved so as to catch the person thrown thereinto.

Another object is to produce a device wherein the net is normally rolled upon a roller and only thrown into operative position when released by the person being caught.

A still further object is to produce a device of this character which may be attached to any automobile now upon the market without materially altering the construction thereof.

A still further object is to produce a device which may be entirely automatic in operation and therefore independent of the driver of the car upon which the same is attached.

Other objects and advantages will be apparent during the course of the following description.

In the accompanying drawings forming a part of this specification, and in which like numerals are employed to designate like parts throughout the same, Figure I is a side elevation of the front portion of an automobile having my device attached thereto, Figure II is a top plan view of Figure I, Figure III is a view similar to Figure I, showing the parts in operative position, Figure IV is a cross sectional detail view of the net-holding roller and its catch, and Figure V is a fragmentary detail view of one of the spring operated drums.

Applicant is aware of the fact that it is common to employ a bumper or fender upon the front of an automobile. These bumpers, however, are not usually intended to serve the purpose of catching the person contacting the bumper, but are for the purpose of preventing injury to the car.

I have therefore provided an automobile bumper of this character whereby a person being struck will be thrown into a net and thereby saved from serious injury.

In the accompanying drawings wherein for the purpose of illustration is shown a preferred embodiment of my invention, the numeral 5 designates an automobile as a whole having front wheels 6, fenders 7 and the usual radiator 8. The side frames of the automobile are shown at 9 and 11 and are of the usual construction.

To the end of these frames are pivoted extensions 12 and 13, on the outer end of which are rigidly secured a box-like structure 14. This box-like structure is adapted to house a roller 16 having a net 17 rolled thereon. The end of this roller is squared as shown at 18 for the reception of a hand-crank, the purpose of which will be later seen.

Braces 19, 21 and 22 extend forwardly and carry a bumper 23 of the usual construction, that is, of spring steel capable of withstanding a substantial blow. Extending downwardly and forwardly from the braces 19, 21 and 22 are braces 24, 26 and 27. These braces serve to position a soft rubber bumper 28.

By viewing Figures 1 and 3, it will be noted that these braces are movable with relation to the braces 19, 21 and 22, the point of connection being slidable. This is to provide for the movement of a tongue 29 formed integral with the brace 27. This tongue extends into the box 14 and abuts a downwardly inclined finger 31 formed upon a pivoted catch 32. This catch is pivoted at 33 and engages a notch 34 formed in the roller 16.

Cables extend from each end of the net 17 and are indicated at 36 and 37. These cables extend over drums 38 and 39 secured to the shaft 41 mounted at a point to the rear of the radiator. This shaft 41 has coiled thereabout a heavy spring 42, one end of which is secured to the radiator and the other end is secured to the shaft.

At 43 I have shown braces which serve to take the strain when the bumper 23 strikes an object.

The operation of my device is as follows:—

Assuming that the parts are in the position shown in Figure 1 and that a person is struck. By having his legs engaged by the rubber bumper 28, the result is that the brace 27 move rearwardly which causes the tongue 29 to engage the finger 31. This immediately releases the roller 16, with the result that the spring 41 imparts a rotation to the drums 38 and 39, thus winding up the cables 36 and 37. This moves the net 17 to the position shown in Figure 3 and at the same time causes the extensions 12 and 13 to move into a line substantially parallel with the side frames 9 and 11.

A catch 44 protruding from the catch 32, extends through the box 14 and into the path of the braces 43. This catch normally holds the parts in the position shown in Figure 1. When it is desired to return the parts to their normal position a crank is applied to the squared end 18 of the roller and a rotary motion is imparted thereto, which results in the winding of the net back into the box and as the cables 36 and 37 unwind from the drums 38 and 39 the spring 42 is again automatically tensioned about the shaft 41, after which stepping on or applying downward pressure to the bumper 23 moves the same into its latched position with the braces 43.

It is to be understood that the form of my invention herewith shown and described is to be taken as a preferred example of the same and that various changes in the shape, size and arrangement of parts may be resorted to without departing from the spirit of the invention or the scope of the subjoined claim.

Having thus described my invention, I claim:—

In a device of the character described, the combination with an automobile having side frames, extensions pivoted to said side frames, a box supported on the ends of said extension, a roller mounted in said box, a net positioned on said roller, a bumper positioned in front of said box, a second bumper positioned in front of and in a plane below said first mentioned bumper, means for preventing rotation of said roller, means associated with said second mentioned bumper for releasing said roller holding means, and means for extending said net to a point adjacent the uppermost edge of the radiator of said automobile.

In testimony whereof I affix my signature.

AGOSTINO RONTANI.